UNITED STATES PATENT OFFICE 2,143,050

MANUFACTURE OF LIGHT HYDROCARBONS

Henry G. Berger, Woodbury, N. J., assignor to Socony-Vacuum Oil Company, Incorporated, New York, N. Y., a corporation of New York No Drawing. Application May 20, 1936, Serial No. 80,745

7 Claims. (Cl. 260—666)

This invention relates to the manufacture of light, generally gaseous hydrocarbons from petrolatum, petroleum residua, and the like.

The object of this invention is to provide a method for the conversion of waste petroleum material of high boiling point into light, generally gaseous hydrocarbons, which may then be further converted by known methods into valuable products, or may be used as such.

This invention is based upon the discovery that petroleum residua of the nature of petrolatum, heavy oils as fuel oils, tars, sludges resulting from refining processes employing an aluminum chloride catalyst, and the like, may be converted, to a substantial degree, by reaction in the presence of aluminum chloride and a chlorinated hydrocarbon to gaseous hydrocarbon compounds of low molecular weight, generally saturated in nature.

The process contemplated involves reacting the petrolatum, or other heavy petroleum product, with nearly equal parts, by weight, respectively, of aluminum chloride and a chlorinated hydrocarbon, as for instance carbon tetrachloride or chlorinated naphtha, at a low temperature, not substantially in excess of 100° C. The gases and vapors evolved may be scrubbed with an alkaline wash reagent to remove hydrogen chloride, and after purification will be found to consist largely of gaseous saturated hydrocarbons of low molecular weight, being composed to a large extent of isobutane, with lesser amounts of isopentane and isohexane.

The heavy hydrocarbon used may also be the aluminum chloride containing sludge from a process of refining, polymerization, or the like, wherein aluminum chloride has been used and remains to a substantial degree in the oily sludge. Such sludges can frequently be used without further addition of aluminum chloride. When such sludges are used, the chlorine necessary for the reaction herein disclosed may frequently be introduced as gaseous chlorine, into the sludge, without the intermediate chlorination of another product to add to the reaction mixture, this operation being equivalent, in effect, to the formation of the chlorinated hydrocarbon in situ.

The process herein disclosed also contemplates the steps of partially chlorinating the heavy hydrocarbon and then reacting it with aluminum chloride.

The proportionate amount of aluminum chloride may in many cases be less than substantially equal, but should in all cases be sufficient to promote reaction at comparatively low temperatures.

Example I 100 parts of petrolatum, 102.4 parts of carbon tetrachloride, and 100 parts of aluminum chloride, all by weight, were reacted together at 80°–95° C. by heating together the petrolatum and aluminum chloride, and then slowly adding the carbon tetrachloride and continuing heating until the reaction was complete, resulting in the production of 43 parts by weight, of the following compositions:

| | Per cent by volume (liquid) |
|---|---|
| Propane and lighter | 3.0 |
| Isobutane | 52.0 |
| Isopentane | 16.0 |
| Isohexane | 10.0 |
| Heavier constituents | 19.0 |
| | 100.0 |

Example II 100 parts each of petrolatum, aluminum chloride and carbon tetrachloride, by weight, were reacted as before, resulting in the production of 42 parts by weight of gases of the following compositions:

| | Per cent by volume (liquid) |
|---|---|
| Propane and lighter | 3.0 |
| Isobutane | 55.0 |
| Isopentane | 15.0 |
| Isohexane | 20.0 |
| Heavier constituents | 7.0 |
| | 100.0 |

Example III

An aluminum chloride containing sludge, resulting from the treatment of a Mid-Continent cylinder stock for 3 hours at about 120° C. was used, after extracting the uncombined oil from the sludge with solvent naphtha. This sludge was reacted with approximately an equal amount of carbon tetrachloride at 80°–95° C. for 10 hours, yielding about ⅓ of the sludge by weight of light hydrocarbon gases of essentially the same composition as the above examples.

Example IV

Another portion of the oil-free sludge as above described was treated with free chlorine at about 80° C. until an amount of chlorine about equal to the weight of the sludge had been consumed. About ¼ of the weight of the sludge was yielded as a mixture of light hydrocarbon gases of essentially the same composition as the above examples.

Example V

Petrolatum was reacted at 80°–90° C. with somewhat less than half its weight of anhydrous aluminum chloride, while adding chlorinated 150° C. end point gasoline, (about 25% chlorine) to the amount of 150% by weight of the petrolatum, resulting in the production of gases of essentially the above indicated composition to the extent of about ¼ of the petrolatum, by weight.

Example VI

Petrolatum, chlorinated with about ¼ of its weight of chlorine, was reacted with aluminum chloride, giving substantially similar results.

This application is a continuation in part of my copending applications Serial No. 3,648, filed January 26, 1935, now U. S. Patent #2,043,824 and Serial No. 3,649, filed January 26, 1935, now U. S. Patent #2,043,825.

I claim:

1. The method of producing a normally gaseous mixture of hydrocarbons composed principally of isoparaffines and substantially free of normal paraffines, olefines, and the like, which comprises reacting together nearly equal quantities, by weight of hydrocarbon residues of high boiling point, aluminum chloride, and chlorinated hydrocarbons of low boiling point, at a temperature not substantially in excess of 100° C. to produce substantial conversion of the hydrocarbon present to such gases, separating said gases from the reaction mixture, and freeing said gases of hydrochloric acid gas.

2. The method of producing a normally gaseous mixture of hydrocarbons composed principally of isoparaffines and substantially free of normal paraffines, olefines, and the like, which comprises reacting a complex sludge material containing aluminum chloride and hydrocarbon material with about an equal amount of chlorinated hydrocarbons at a temperature not substantially in excess of about 100° C. to produce substantial conversion of the hydrocarbons present to such gases, separating said gases from the reaction mixture, and freeing said gases of hydrochloric acid gas.

3. The method of producing a normally gaseous mixture of hydrocarbons composed principally of isoparaffines and substantially free of normal paraffines, olefines, and the like, which comprises reacting together petroleum residues of high boiling point, aluminum chloride, and chlorine, the reactant proportions being such as to give rise to nearly equal proportions of aluminum chloride, chlorinated hydrocarbon, and unchlorinated hydrocarbon, the reaction being carried out at temperatures not in excess of about 100° C., to produce substantial conversion of the hydrocarbons present to such gases, separating said gases from the reaction mixture, and freeing said gases of hydrochloric acid gas.

4. The method of producing a normally gaseous mixture of hydrocarbons composed principally of isoparaffines and substantially free of normal paraffines, olefines, and the like which comprises reacting together a complex sludge material containing aluminum chloride and hydrocarbon materials with chlorine, the chlorine being present to an extent sufficient to chlorinate about half of the hydrocarbon present, the reaction being carried out at a temperature not substantially in excess of about 100° C., to produce substantial conversion of the hydrocarbons present to such gases, separating said gases from the reaction mixture, and freeing said gases of hydrochloric acid gases.

5. The method of utilizing a complex sludge material obtained from a treatment of petroleum hydrocarbons with aluminum chloride and containing a substantial amount of aluminum chloride for the production of valuable hydrocarbons which comprises treating said sludge at a temperature not substantially in excess of about 100° C. with a sufficient amount of chlorine to produce a normally gaseous product composed principally of isoparaffines of relatively low molecular weight, and recovering said normally gaseous product.

6. The method of utilizing a complex sludge material obtained from a treatment of petroleum hydrocarbons with aluminum chloride and containing a substantial amount of aluminum chloride for the production of valuable hydrocarbons which comprises reacting said sludge at a temperature not substantially in excess of about 100° C. with sufficient amount of chlorinated hydrocarbons to produce a normally gaseous product composed principally of isoparaffines of relatively low molecular weight, and recovering said normally gaseous product.

7. The method of producing a normally gaseous product composed principally of isoparaffines of relatively low molecular weight which comprises reacting petroleum residues of relatively high boiling point at a temperature not substantially in excess of about 100° C. with sufficient amounts of aluminum chloride and chlorinated hydrocarbons to produce said normally gaseous product composed principally of isoparaffines of relatively low molecular weight, and recovering said normally gaseous product.

HENRY G. BERGER.